United States Patent
Harris

(10) Patent No.: US 6,616,838 B1
(45) Date of Patent: Sep. 9, 2003

(54) NO-SPILL OIL FILTER

(76) Inventor: Lazarus E. Harris, 1289 Old Highway 49 North, Florence, MS (US) 39073

( * ) Notice: Subject to any disclaimer, the term of this patent is extended or adjusted under 35 U.S.C. 154(b) by 0 days.

(21) Appl. No.: 09/839,722

(22) Filed: Apr. 20, 2001

(51) Int. Cl.[7] .............................................. B01D 27/08
(52) U.S. Cl. ....................... 210/233; 210/248; 210/444; 210/DIG. 17
(58) Field of Search ................................ 210/233, 248, 210/303, 413, 444, DIG. 17, 168, 440, 443; 123/196 A; 184/6.24

(56) References Cited

U.S. PATENT DOCUMENTS

| | | | | |
|---|---|---|---|---|
| 2,524,336 A | * | 10/1950 | Vokes | 210/131 |
| 5,421,223 A | * | 6/1995 | Wawrzyniak | 210/238 |
| 5,753,116 A | * | 5/1998 | Baumann et al. | 123/1 A |

FOREIGN PATENT DOCUMENTS

FR     600715 A   *   2/1926 ................. 210/303
GB     463832 A   *   4/1937 ................. 210/303

* cited by examiner

*Primary Examiner*—Matthew O. Savage
(74) *Attorney, Agent, or Firm*—Robert M. Jackson; Kenneth M. Bush; Bush IP Law Group, LLC

(57) ABSTRACT

The present invention relates to a replaceable oil filter and method of using a replaceable oil filter that allows the oil filter to be disengaged from an engine without the spillage of residual used oil. The present invention relates to a replaceable oil filter comprising a housing having an upper portion with a top end forming an opening for threaded engagement with an engine, a filtration unit positioned within the upper portion, a lower portion forming a reservoir subjacent the upper portion, an impermeable barrier separating the upper portion and the lower portion to prevent fluid communication therebetween, and a means for establishing fluid communication between the upper portion and the lower portion to drain residual used oil from the upper portion into the reservoir prior to disengaging the replaceable oil filter from an engine. The present invention also comprises a method for easily replacing an oil filter with minimal or no spillage of residual used oil.

20 Claims, 6 Drawing Sheets

NO-SPILL OIL FILTER

FIELD OF THE INVENTION

The present invention relates to the field of fluid filtration devices for use with engines. In greater particularity the present invention relates to a replaceable oil filter and method of using a replaceable oil filter that allows the oil filter to be disengaged from an engine without the spillage of residual oil. In still further particularity, the present invention relates to a replaceable oil filter comprising a housing having an upper portion forming an opening for threaded engagement with an engine, a filtration unit positioned within the upper portion, a lower portion forming a reservoir subjacent the upper portion, an impermeable barrier separating the upper portion and the lower portion to prevent fluid communication therebetween, and a means for establishing fluid communication between the upper portion and the lower portion to drain residual oil from the upper portion into the reservoir prior to disengaging the replaceable oil filter from an engine.

BACKGROUND OF THE INVENTION

Waste oil that has been used for the lubrication of engines, generally referred to as used oil, is a significant threat to the environment. Used oil is a pollutant that can contain toxic chemicals and heavy metals. The United States Environmental Protection Agency estimates that the amount of used oil from a single oil change of an automobile engine can ruin up to a million gallons of fresh water.

Large volumes of used oil are generated each year. The annual volume of used oil generated from automobiles alone is estimated to exceed 300 million gallons. Historically, used oil was disposed of without alteration or treatment into the environment by pouring used oil into storm drains or placing it into trashcans. The significant adverse effect on the environment of these activities have been increasingly recognized and as a result, federal and state governments have developed comprehensive programs for the proper handling and disposal of used oil. In addition to the environmental benefits gained from preventing the improper disposal of used oil, there are also significant environmental and economic benefits to be gained from recycling used oil. Recycling a gallon of used oil generates approximately the same amount of lubricating oil produced from a barrel of crude oil, and it is estimated that recycling used oil from automobiles alone would save over two million barrels of oil each day. There is a need for improved techniques for managing used oil.

Traditional methods of changing oil filters results in the spillage of used oil. Even after a crankcase is drained of used oil, unscrewing and removal of an oil filter cartridge results in the spillage of residual used oil contained in the oil filter cartridge itself as well as residual oil in the engine proximate the oil filter. The spillage of residual used oil occurring during the unscrewing and removal of an oil filter cartridge causes unnecessary exposure of the person changing an oil filter to used oil. It also causes the unnecessary contamination of the adjacent work area. Used oil spilled during replacement of oil filters is either sprayed into storm drains, cleaned up using absorbent material and disposed of in a solid waste landfill, or released directly into the environment. The cumulative impact of these releases of used oil to waterways and landfills has an adverse impact on the environment.

The prior art has utilized various techniques to address this problem. U.S. Pat. No. 5,431,588 to Kucik disclosed an oil filter cartridge having a nipple on the bottom of the filter and a valve for opening the nipple to drain residual used oil remaining in the oil filter cartridge after used oil has been drained from a crankcase. The Kucik device requires the use of a used oil container disposed directly under the outlet of the nipple for the receipt of used oil, or the use of a hose connected to the end of the nipple as well as a container disposed directly under the end of the hose opposite the nipple for the receipt of used oil. As disclosed in the Kucik patent, other prior art techniques include disposing a large plastic bag directly under the filter cartridge assembly for the receipt of used oil released from the filter cartridge during unscrewing and removal of the filter cartridge assembly.

The conventional techniques used to minimize the spillage of used oil during the unscrewing and removal of an oil filter from an engine have several limitations. These techniques involve the transfer of used oil released from an oil filter cartridge. Associated with each of these used oil transfer steps, including the transfer of used oil into and out of hoses and into various containers including plastic bags, is the risk of used oil spillage. These risks are heightened by the limited space available for removing an oil filter cartridge, and the difficulty in properly positioning containers and hoses in cramped quarters. These methods also result in the contamination of various articles associated with transferring and containing used oil released from an oil filter cartridge. To address the limitations of the prior art, what is needed is an improved replaceable oil filter that can be disengaged from an engine after use without the spillage of used oil and without releasing used oil from the oil filter cartridge. What is needed is an improved method of removing a used oil filter cartridge from an engine that is simple and easy to use, and that minimizes or eliminates the release of used oil from the cartridge, and thereby reduces the adverse impacts to the environment resulting from the mismanagement of used oil.

SUMMARY OF THE INVENTION

An object of the present invention is to provide an improved replaceable oil filter for use with an engine.

Another object of the present invention is to provide an improved replaceable oil filter that can be disengaged from an engine without the spillage of excess used oil.

A further object of the present invention is to provide a replaceable oil filter that can be easily disengaged from an engine with minimal or no release of used oil from the oil filter cartridge.

An additional object of the present invention is to provide a more efficient and environmentally protective method of changing a replaceable oil filter that reduces the risk of spilling used oil.

A still further object of the present invention is to provide a replaceable oil filter that minimizes or eliminates the release of used oil from the oil filter cartridge prior to disengaging the oil filter from an engine.

Another object of the present invention is to provide an oil filter that can be installed on or disengaged from an engine without using a filter wrench.

A still further object of the present invention is to provide an oil filter that can be installed on or disengaged from an engine utilizing conventional tools such as a socket wrench or screwdriver without having to use a filter wrench.

An additional object of the present invention is to provide an oil filter that can be installed on an engine or tightened within a desire torque range using a torque wrench to prevent overtightening and undertightening of the oil filter.

Another object of the present invention is to provide a replaceable oil filter that allows for the draining and containment of residual used oil from an oil filtration unit without releasing used oil from the oil filter cartridge housing prior to disengaging the oil filter from an engine.

A further object of the present invention is to provide an easy method of draining residual used oil from an oil filtration unit and containing residual oil drained from an oil filtration unit in a used oil reservoir without releasing used oil from the oil filter cartridge housing prior to disengaging the oil filter from an engine.

These and other objects of the present invention are provided by a replaceable oil filter having a reservoir for the receipt and containment of residual used oil prior to removing the oil filter from an engine. The present invention comprises a replaceable oil filter comprising a housing having an upper portion forming an opening for threaded engagement with an engine, a filtration unit positioned within the upper portion, a lower portion forming a reservoir subjacent the upper portion, an impermeable barrier separating the upper portion and the lower portion to prevent fluid communication therebetween, and a means for establishing fluid communication between the upper portion and the lower portion to drain residual oil from the upper portion into the reservoir prior to disengaging the replaceable oil filter from an engine.

The upper portion of the present invention comprises the configuration of oil filtration units having configurations that are well known in the art. The threaded opening provided in the top end of the upper portion of the present invention may be of various standard configurations that are well known in the art. It is assumed that the housing of the present invention has a conventional cylindrical shape, and that the oil filter of the present invention is attached to an engine by the conventional method of threaded engagement therewith by the clockwise rotation of the filter cartridge. Alternate configurations of the upper portion of the present invention and alternate means for attaching the oil filter to an engine are contemplated, and the use of standard configurations for the upper portion of the present invention are not intended to limit the scope of the disclosure.

The barrier of the present invention comprises an impermeable layer subjacent the upper portion forming an aperture and an assembly sealing the aperture during the use of the replaceable oil filter. Thus, it can be appreciated that during use there is fluid communication between the engine and the upper portion of the oil filter containing the filtration unit as in a conventional oil filter. Further, during use of the oil filter there is no fluid communication between the upper portion of the filter and the lower portion of the present invention, thus the oil filter functions in the same manner as a conventional oil filter. After the oil filter has been used, and prior to disengaging the oil filter from an engine, the present invention provides for unsealing the aperture and allowing fluid communication between the upper portion and the lower portion through the aperture, allowing residual oil in the upper portion to drain into the reservoir formed by the lower portion.

Various assemblies and associated methods of sealing the aperture to form an impermeable barrier that are well known in the art may be used. It is contemplated that a valve seat assembly may be placed in conforming contact with a seat portion of the barrier layer circumscribing the aperture. The seat may be placed on a seat portion of the upper surface of the barrier wherein the aperture is opened by raising the seat assembly from the barrier layer. The seat may also be placed on a seat portion of the bottom surface of the barrier wherein the aperture is opened by lowering the seat assembly from the barrier layer. Sealing contact between the seat assembly and the barrier layer may be maintained by well known configurations of the respective valve seat assembly and seat portion that encourage conforming contact therebetween. Sealing contact may also be encouraged by the use of a barrier layer or valve seat assembly comprising a sealing means such as an o-ring or gasket proximate the seat portion of the barrier layer. For instance, it is contemplated that the barrier layer comprises a horizontal plate forming a circular aperture and the valve seat assembly comprises a horizontal disc. A portion of the surface of the disc may be placed in conforming contact with either the upper or lower surface of the barrier layer to seal the aperture. Sealing contact between the disc and the barrier layer may be encouraged by the use of one or more sealing means comprising a circular gasket comprising the seat portion of the barrier layer or a circular gasket attached to the disc and comprising the portion of the valve seat assembly placed in conforming contact with the barrier layer. Where a valve seat assembly is used, a means for urging the seat assembly against the barrier layer must be provided during the use of the filter to maintain an impermeable barrier between the upper portion and the lower portion of the filter housing.

In the alternative, the aperture formed in the barrier layer may be sealed using a breakable sealer that maintains an impermeable barrier during the use of the oil filter. Sealing contact between the breakable seal and the barrier layer may be maintained by various adhering means such as the use of appropriate adhesive affixing the breakable seal to the barrier layer. After the oil filter has been used, the breakable seal itself may be pierced to create a passageway for fluid communication between the upper and lower portion of the oil filter. In the alternative, the breakable seal may comprise a solid impervious material that is separated from the barrier layer by application of a force that causes the adhesive means to break and the breakable seal to lift from the surface of the barrier layer to create a passageway for fluid communication. It can be appreciated that the use of a breakable seal may not require the use of an external means for urging the breakable seal against the barrier layer.

The present invention further comprises a lower portion that forms a threaded opening and a means for establishing fluid communication between the upper portion and the lower portion comprising an elongated valve stem having a threaded base portion screwed into the threaded opening. The elongated valve stem has an upper portion fixedly attached at its distal end to the valve seat assembly. The threaded base portion is in confronting engagement with the threaded opening. Initially, the valve stem is positioned to maintain the valve seat assembly in sealing contact with the barrier layer, with the valve seat contacting either the upper surface or the bottom surface of the barrier layer. After the oil filter has been used, the threaded base portion is rotated to urge the valve seat assembly away from sealing contact with the seat portion of the barrier layer. This creates a passageway for fluid communication between the upper portion and the lower portion through the aperture. Where the valve seat assembly is positioned above the barrier layer, a portion of the bottom surface of the valve seat assembly is in sealing contact with the seat portion of the barrier layer. With this configuration, the counterclockwise rotation of the threaded base portion urges the valve stem upward and raises the valve seat assembly off of the barrier layer. Where the valve seat assembly is positioned below the barrier layer, a portion of the upper surface of the valve seat assembly is in sealing contact with the seat portion of the barrier layer. With this configuration, the counterclockwise rotation of the threaded base portion urges the valve stem downward and lowers the valve seat assembly from the surface of the barrier layer.

As previously discussed, the aperture formed in the barrier layer of the present invention may be sealed using a breakable sealer. The breakable sealer is in sealing engagement with the seat portion of the upper portion circumscribing the aperture. Where the aperture is sealed with a breakable sealer, the means for establishing fluid communication is an elongated plunger having a piercier portion at its distal end and a threaded base portion at its proximal end in confronting engagement with the threaded opening of the lower portion. The distal end of the elongated plunger being the piercer is positioned directly below the breakable seal. The counterclockwise rotation of the threaded base portion urges the plunger upwards until the distal end thereof passes through the aperture. Where the breakable sealer comprises a material that can be pierced by the distal end of the plunger, the distal end creates a passageway for fluid communication by piercing the breakable seal. Where the breakable sealer is comprised of a substantially impervious material, the distal end of the plunger lifts the breakable sealer from sealing contact with the seat portion of the barrier layer. This may occur, for instance, by causing a failure in the adhesive means for attaching the breakable sealer to the barrier layer to allow a passageway through the aperture for fluid communication between the upper portion and the lower portion.

The threaded base portion of the plunger or valve stem further includes a means on a lower end thereof for engagement with a selected tool to impart rotation to said threaded base portion. This means for engagement may comprise a drive socket for use with a socket wrench or ratchet. The means for engagement may also comprise a drive head formed in the threaded base portion for engagement with a selected tool such as screwdriver. The means for engagement with a selected tool allows the oil filter assembly to be torqued without using a filter wrench. Prior to use, the base portion of the present invention is positioned against a stop formed in the threaded opening that prevents the clockwise rotation of the base portion. Thus, imparting a clockwise torque to the engagement means of the threaded base portion imparts a clockwise torque to the entire oil filter assembly. The threaded base portion does not rotate independent of the oil filter housing. Instead there is concomitant clockwise rotation of the threaded base portion and the filter housing. It can be appreciated that the application of a torque to the engagement means may be used to install the filter housing onto an engine. The application of such a torque causes the clockwise rotation of the entire filter assembly without urging the base portion upward or downward in relation to the oil filter housing. The present invention allows for the installation of oil filters of the present invention having various sizes and configurations by using selected standard tools such as a socket wrench or a screwdriver. The present invention allows installing an oil filter using various standard tools without having to use one or more filter wrenches. Using a torque wrench allows the oil filter of the present invention to be installed within the proper torque range without undertightening or overtightening the oil filter.

As discussed, the oil filter of the present invention is secured to the engine by application of a torque that cause the oil filter to rotate in a clockwise direction. This positions the oil filter for a period of use wherein no torque is applied to the threaded base member to maintain the integrity of the impermeable barrier layer. After the oil filter has been used, however, a torque is applied in the opposite counterclockwise direction to the engagement means of the threaded base member. Initially, this causes the counterclockwise rotation of the base portion without an associated rotation of the filter housing. This continues until the aperture is opened by the upward or downward movement of the valve stem or plunger. After the aperture has opened, the base portion is seated against the filter housing to prevent the further counterclockwise rotation of the base portion without an associated rotation of the filter housing. Thus, the continued application of a counterclockwise torque results in the concomitant counterclockwise rotation of the entire filter assembly which loosens and ultimately disengages the oil filter from the engine.

The present invention further comprises an indicating means that allows a user to determine if the barrier layer is intact or if the aperture formed in the barrier layer has been opened. The indicating means may be a visual reference indicating that the base portion has rotated from its initial position sufficient to establish fluid communication between the upper portion and the lower portion of the filter housing. The indicating means may comprise a breakable seal having one end affixed to the filter housing and the other end affixed to the threaded base member, wherein the seal is broken upon rotation of the base member without an associated rotation of the filter housing. The indicating means may also comprise marking on the surface of the threaded base portion and the surface of the filter housing that shows the extent of rotation of the threaded base member in relationship to the filter housing. Thus, the indicating means allows a user to readily determine if a filter housing is new or used.

Prior to disengaging the oil filter from the engine, the present invention has opened the aperture and allowed residual oil contained in the upper portion of the oil filter housing, as well as residual oil in the engine proximate the oil filter, to drain into the lower portion of the oil filter subjacent the upper portion. The lower portion forms a reservoir for holding the residual oil within the oil filter housing. One or more sealing means may be provide for preventing the residual oil from escaping the oil filter housing through the threaded opening formed in the lower portion of the housing. This may include a gasket means for sealing between said valve stem and said threaded opening to prevent the release of fluid from said reservoir.

The present invention also comprises a method for easily replacing an oil filter with minimal or no spillage of residual used oil. The method utilizes a replaceable oil filter having a housing having an upper portion with a top end forming an opening for threaded engagement with an engine, and a lower portion forming a reservoir. The replaceable oil filter further comprises a fluid filtration unit positioned within the upper portion, a barrier assembly separating the upper portion and the lower portion to prevent fluid communication therebetween, and a means for establishing fluid communication between the upper portion and the reservoir. The method comprises the steps of draining oil from the crankcase of an engine, establishing fluid communication between the upper portion and the reservoir to drain at least a portion of the residual oil from the upper portion into the reservoir, and removing the replaceable oil filter from the engine with the residual oil contained within the reservoir.

Where the barrier assembly of the replaceable oil filter comprises a valve seat assembly in sealing engagement with the seat portion of the barrier layer, the establishing step comprises urging the valve seat assembly from sealing contact with the seat portion to provide a passageway for fluid communication between the upper portion and the lower portion through the aperture. Where the barrier assembly comprises a breakable seal in sealing engagement with the seat portion of the barrier layer, the establishing step comprises urging said the breakable seal from sealing contact with the seat portion or piercing the breakable seal to provide a passageway for fluid flow through the aperture.

These and other objects, features, aspects and advantages of the present invention will become more apparent from the following detailed description of the present invention when taken in conjunction with the accompanying drawings.

BRIEF DESCRIPTION OF THE DRAWINGS

A device embodying the features of my invention and an apparatus for use with my invention are depicted in the accompanying drawings which form a portion of this disclosure and wherein.

DESCRIPTION OF THE PREFERRED EMBODIMENT

Figure 1:
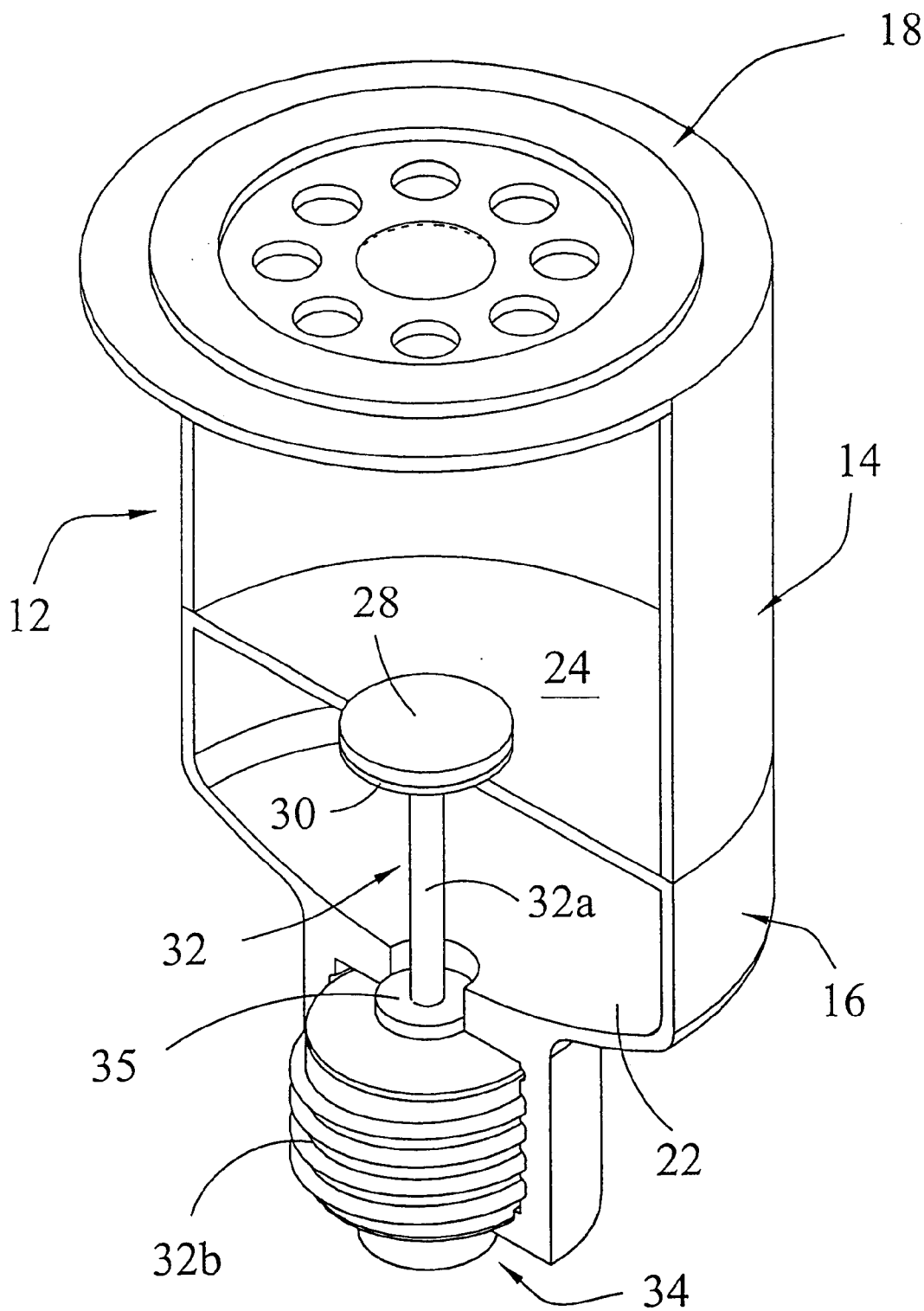
FIG. 1 is a perspective view of the preferred embodiment of the present invention.
Figure 2:
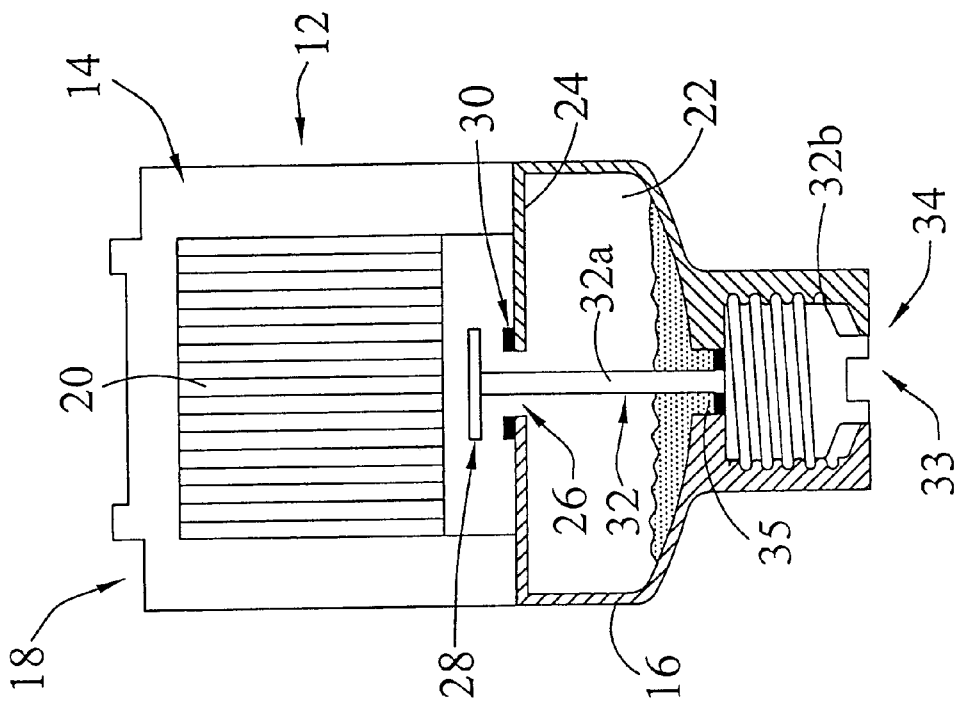
FIG. 2 is a side elevational view of the preferred embodiment of the present invention with the valve seat assembly in sealing contact with the barrier layer.
Figure 3:
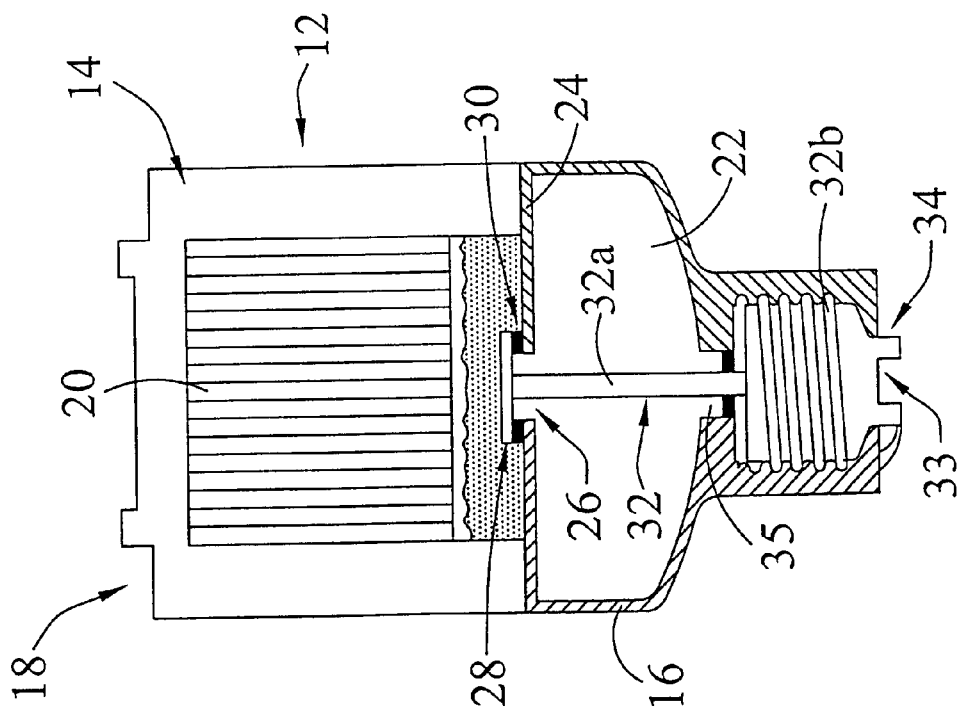
FIG. 3 is a side elevational view of the preferred embodiment of the present invention with the valve seat assembly positioned above the barrier layer.

Referring to the drawings for a clearer understanding of the invention, it will be seen in FIGS. 1–3 that the invention relates to a replaceable oil filter. The preferred embodiment of the present invention comprises a cylindrical housing 12 having an upper portion 14 and a lower portion 16. The upper portion 14 has a top end forming a centrally located opening 18 for threaded engagement with an engine. Positioned within the upper portion 14 is a fluid filtration unit. The lower portion 16 of the housing 12 forms a reservoir subjacent the upper portion 14. The invention also comprises an impermeable barrier assembly comprising a horizontal plate 24 forming a centrally located aperture and a valve seat assembly comprising a flat cylindrical disk 28. In the preferred embodiment, the barrier assembly further comprises a sealing means comprising a cylindrical gasket 30 attached to the top surface of the horizontal plate 24. The gasket 30 circumscribes the aperture 26 to form a seat portion of the barrier assembly. When the valve seat assembly 28 is placed in conforming contact with the seat portion 30 of the horizontal plate, the barrier assembly forms an impermeable barrier between the upper portion 14 and the lower portion 16 of the oil filter assembly.

The preferred embodiment of the present invention further comprises a means for establishing fluid communication between the upper portion 14 and the lower portion 16 to drain residual oil from the upper portion 16 into the reservoir 22 prior to disengaging the replaceable oil filter from an engine. In the preferred embodiment, the valve seat assembly 28 is positioned above the aperture 26. The means for establishing comprises an elongated valve stem 32 fixedly attached to the bottom surface of the valve seat assembly 28. The valve stem 28 has a threaded base portion 32b screwed into a centrally located threaded opening 34 formed in the lower portion 16 of the oil filter housing 12. The valve stem 32 has an upper portion 32a fixedly attached at its distal end to the valve seat assembly 28. The threaded base portion 32b is screwed into the threaded opening 34 and placed into an initial position as shown in FIG. 2. In the initial position, the valve seat assembly 28 is in sealing contact with the seat portion 30 of the barrier assembly. The clockwise, or rightward, rotation of the lower end of the threaded base portion lowers the valve stem 32 and the valve seat assembly 28. In the initial position, the downward motion of the valve seat assembly 28 prevented by the barrier assembly, so the clock wise rotation of the valve stem 32 without associated rotation of the oil filter assembly 12 is prevented. Thus, in the initial position the engagement of the oil filter assembly 12 onto the engine may be accomplished by applying a torque to the threaded base portion 32b to cause the clockwise rotation of the entire oil filter assembly 12. The application of this torque does not result in the upward or downward movement of the valve stem 32.

The threaded base portion 32b of the valve stem further includes a means on the lower end thereof for engagement with a selected tool to impart rotation to the threaded base portion 32b. In the preferred embodiment, the means for engagement comprises a drive socket for use with a socket wrench or ratchet. The means for engagement with a selected tool allows the oil filter assembly to be torqued without using a filter wrench.

As previously discussed, prior to using the oil filter the base portion 32b of the present invention is positioned against a stop formed in the threaded opening 34 that prevents the clockwise rotation of the base portion 32b without the concomitant rotation of the oil filter assembly 12. In this initial position, as shown in FIG. 2, the threaded base portion 32b does not rotate clockwise independent of the oil filter housing 12. Instead, there is concomitant clockwise rotation of the threaded base portion 32b and the filter housing 12. Because the engagement means may be used to install the filter housing 12 onto an engine, the present invention allows for the installation of oil filters having various sizes and configurations using selected standard tools such as a socket wrench or a screwdriver. The present invention allows for the installation of an oil filter without having to use a filter wrench. Using a torque wrench allows the oil filter of the present invention to be installed within the proper torque range without undertightening or overtightening the oil filter.

After the oil filter has been used, a torque is applied to the engagement means of the threaded base member in a counterclockwise, or leftward direction. In the preferred embodiment, this initially causes the counterclockwise rotation of the base portion 32b without an associated rotation of the filter housing 12. The counterclockwise rotation of the base portion 32b raises the valve stem 32 and lifts the valve seat assembly 28 off of the seat portion 30 of the barrier assembly. The valve seat assembly 28 in this raised position is shown in FIG. 3. Lifting the valve seat assembly 28 from the seat portion 30 of the barrier assembly opens the aperture 26. This creates a passageway for fluid communication between the upper portion 14 and the lower portion 16 through the aperture 26. Residual oil contained in the upper portion 14 and in the engine proximate the oil filter assembly drains into the reservoir 22 formed by the lower portion of the oil filter housing 16. One or more sealing means may be provided to prevent the release of residual oil from the oil filter housing through the threaded opening 34 formed in the lower portion 16 of the housing. In the preferred embodiment, a cylindrical seal that circumscribes a portion of the valve stem 32a proximate the threaded base portion is provided. Other sealing means to prevent the release of residual used oil from the reservoir 22 may be provided including a plurality of seals, gaskets, and o-rings.

In the preferred embodiment, after the aperture 26 has been opened by the upward rotational movement of the valve stem 32 and valve seat assembly 28, the base portion 32b is seated against the filter housing to prevent further counterclockwise rotation of the base portion 32b without an associated rotation of the filter housing 12. The continued application of a counterclockwise torque to the engagement means 36 results in the concomitant counterclockwise rotation of the entire filter assembly 12, which progressively loosens and ultimately disengages the oil filter from the engine.

Figure 4:
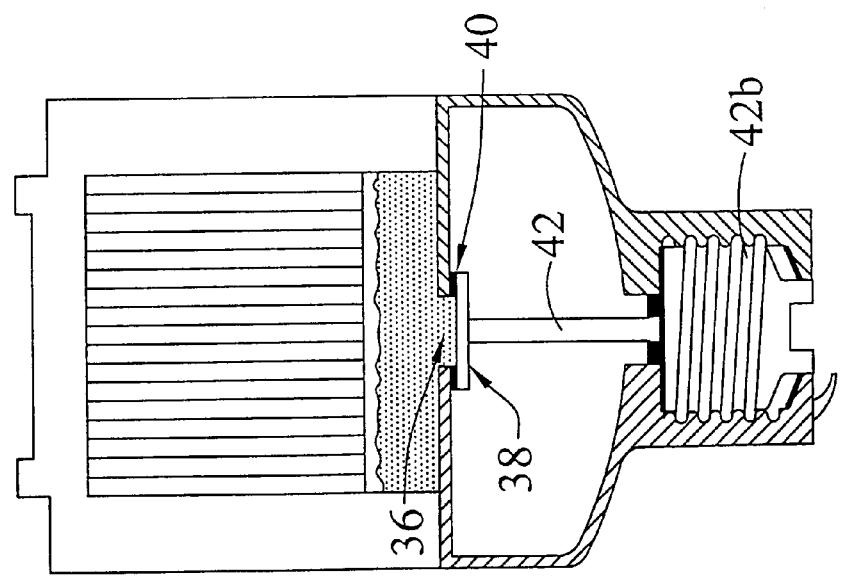
FIG. 4 is a side elevational view of a second embodiment of the present invention with the valve seat assembly in sealing contact with the barrier layer.
Figure 5:
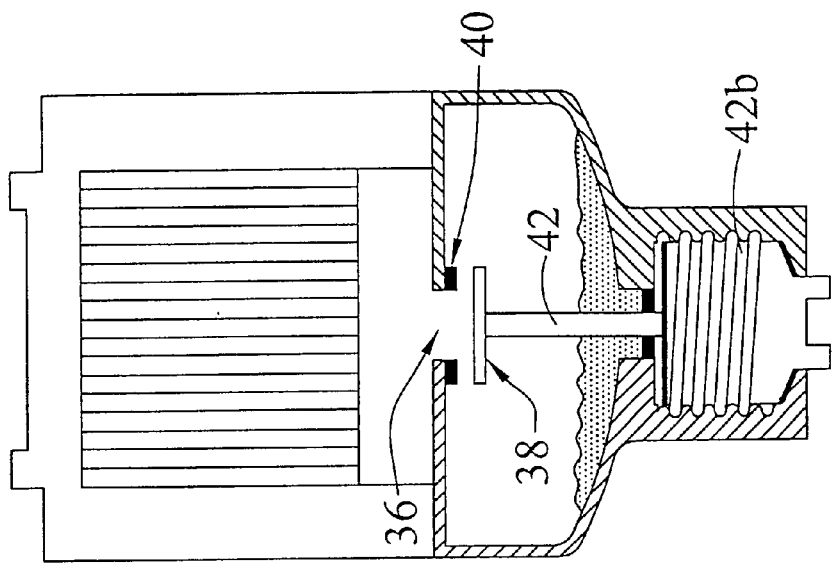
FIG. 5 is a side elevational view of a second embodiment of the present invention with the valve seat assembly positioned below the barrier layer.

A second embodiment of the present invention is shown in FIGS. 4 and 5. In the second embodiment, the valve seat assembly 38 is positioned below the aperture 36. The seat portion 40 of the barrier assembly is position above the valve seat assembly 38. As shown in FIG. 4, the initial position of the valve stem 42 is in a raised position wherein the valve seat assembly is in conforming contact with the seat portion 40 of the barrier assembly. The counterclockwise rotation of the base portion 42b lowers the valve stem 42 and lowers the valve seat assembly 28 off of the seat portion of the barrier assembly 38. The valve seat assembly 38 in this lowered position is shown in FIG. 5. Lowering the valve seat assembly 38 from the seat portion 40 of the barrier assembly opens the aperture 36, creating a passageway for fluid flow through the aperture 36.

Figure 7:
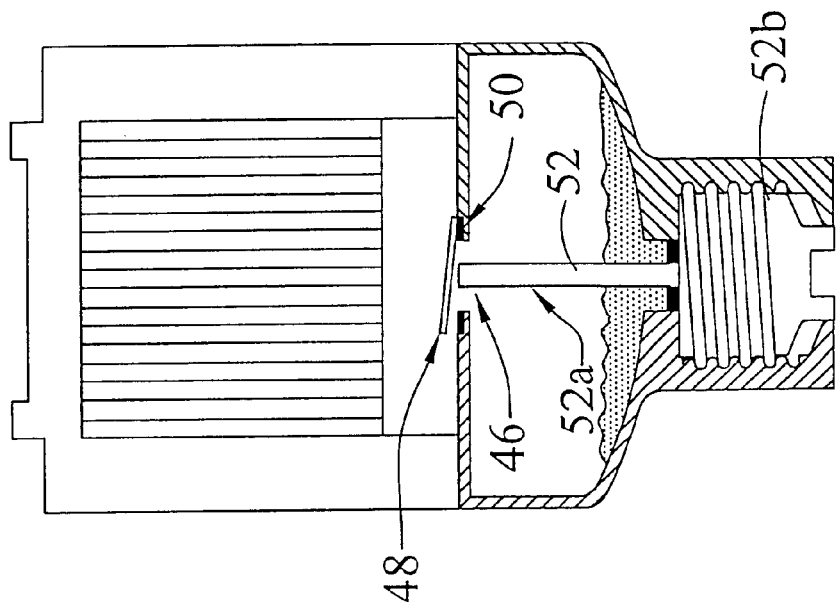
FIG. 7 is a side elevational view of a third embodiment of the present invention with the breakable seal in a broken position.
Figure 6:
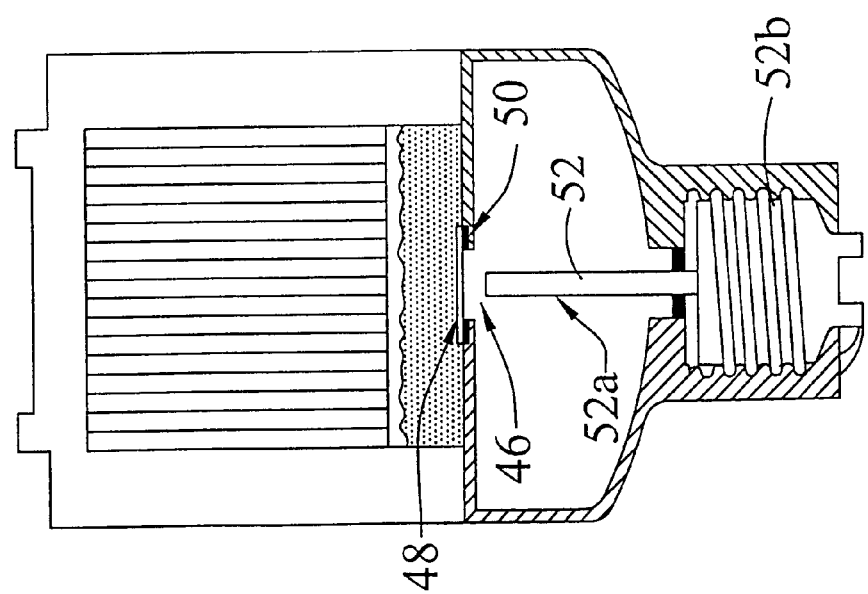
FIG. 6 is a side elevational view of a third embodiment of the present invention with the breakable seal in a sealing position.

A third embodiment of the present invention is shown in FIGS. 6 and 7. In the third embodiment, the barrier layer of the present invention is sealed using a breakable sealer. The breakable sealer 48 is in sealing engagement with the seat portion 50 of the barrier assembly circumscribing the aperture 48. The means for establishing fluid communication is an elongated plunger 52 having a piercer portion 52a at its distal end and a threaded base portion 52b at its proximal end. The distal end 52a of the elongated plunger is positioned directly below the breakable seal 48. The initial position of the third embodiment of the present invention wherein the breakable sealer is intact is shown in FIG. 6. The counterclockwise rotation of the base portion 52b raises the plunger 42 and lifts the breakable seal 48 off of the seat portion 40. The breakable seal 48 in this raised or broken position is shown in FIG. 7. Raising the breakable seal 48 from the seat portion 50 of the barrier assembly opens the aperture 46, creating a passageway for fluid flow through the aperture 46.

Figure 8:
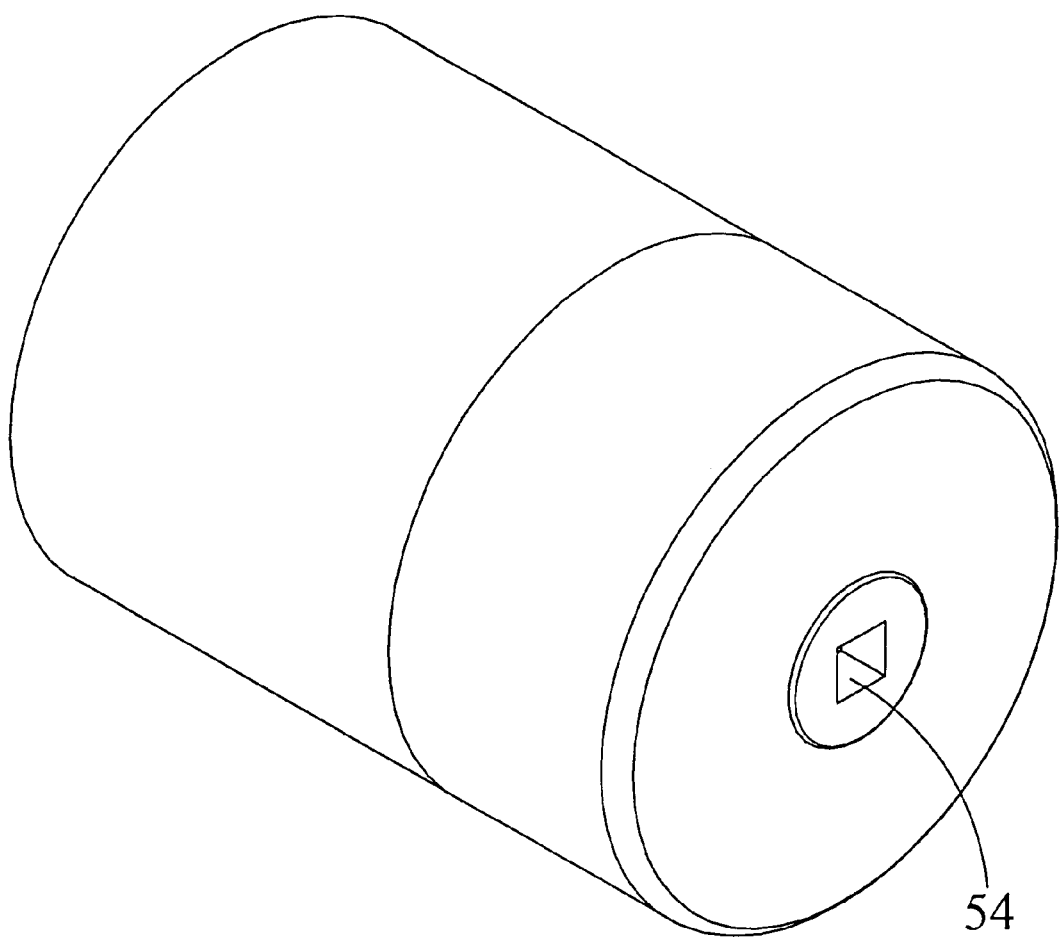
FIG. 8 is a perspective view of a fourth embodiment of the present invention.
Figure 9:
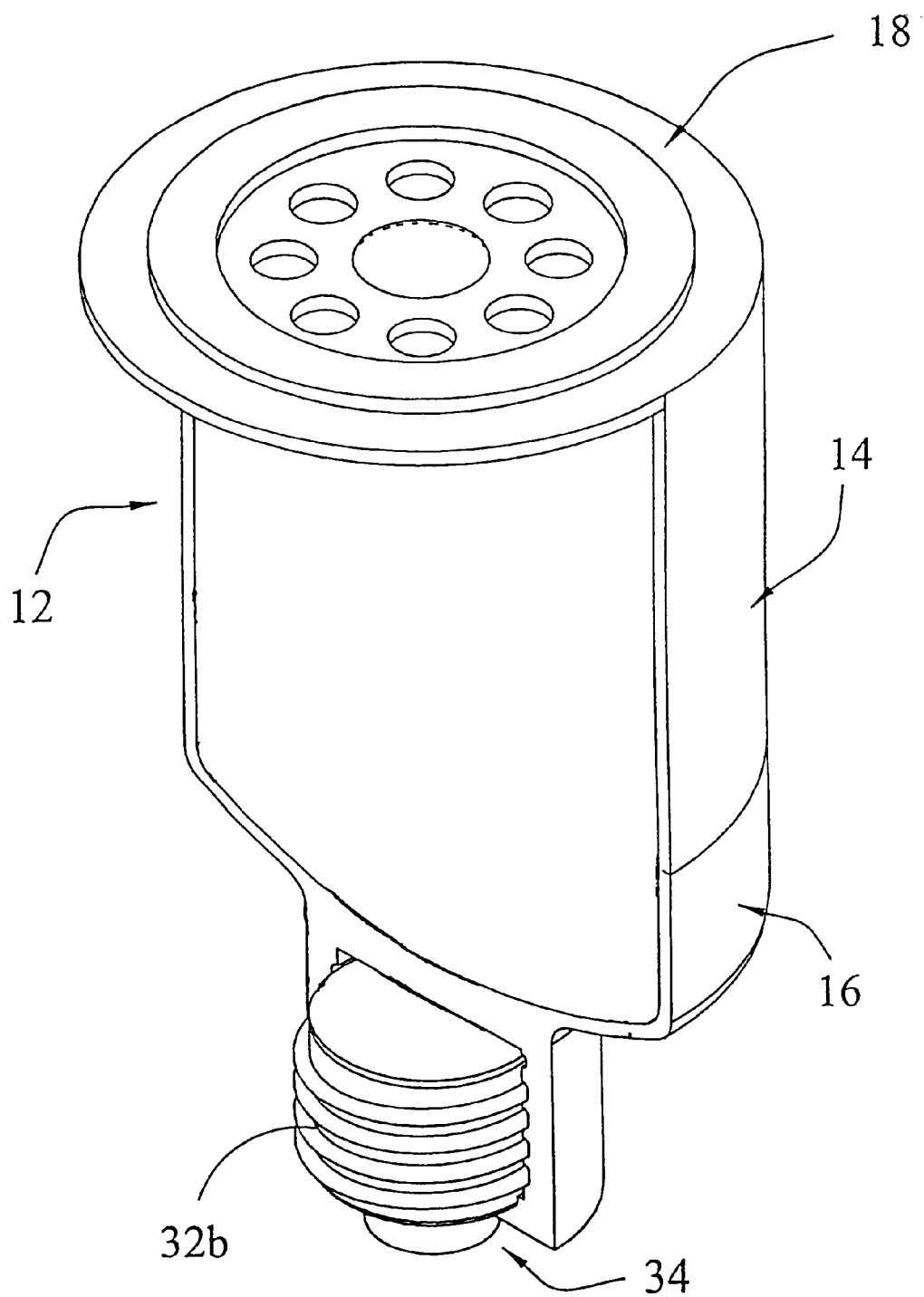
FIG. 9 is a second perspective view of a fourth embodiment of the present invention.

A fourth embodiment of the present invention is shown in FIGS. 8 and 9. In this embodiment, the means of engagement 54 may be used to install the filter housing 12 onto an engine and to remove the filter housing. Unlike the other embodiments, the engagement means 54 is independent of the means for establishing fluid communication (not shown), so a primary feature of the fourth embodiment is the use of the engagement means 54 to install and remove oil filters having various sizes and configurations using selected standard tools such as a socket wrench or a screwdriver. For the fourth embodiment, various assemblies and associated methods of sealing and unsealing the aperture to prevent or allow, respectively, fluid communication between the upper portion and the lower portion may be used, these assemblies and methods being operationally independent from the engagement means 54. In FIG. 9, the fourth embodiment has a threaded base portion 32b that is used only for tightening or loosening the filter housing 12 onto or away from the engine block. The use of the threaded base portion 32b as shown in FIG. 9 provides a means for readily removing or installing a filter without the need for an oil filter wrench. This type of filter with or without a reservoir 22 could be used on gasoline-type engines that often don't carry vertically-mounted filters. The fourth embodiment of the present invention allows for the installation of an oil filter with standard tools to the proper torque range.

The preferred embodiment of the present invention also comprises an indicating means (not shown) that allows a user to determine if an opening in the barrier layer has been established. In the preferred embodiment, the indicating means comprises visual references indicating that the threaded base portion 32b has been torqued, or rotated, from its initial position sufficient to establish fluid communication between the upper portion 14 and the lower portion 16 of the filter housing. The indicating means in the preferred embodiment comprises a breakable strip having one end affixed to the lower end of the filter housing 12 and a second end affixed to the lower end of the threaded base member 32b. This strip is so affixed to the oil filter assembly 12 after the assembly has been placed in its initial position as shown in FIG. 2. The strip is broken upon rotation of the threaded base portion 32b without an associated rotation of the filter housing 12. In the preferred embodiment, the indicating means also comprises markings on the lower end of the threaded base portion 32b and the lower end of the filter housing 12 that shows the extent of rotation of the threaded base portion 32b in relationship to the filter housing 12. The indicating means of the preferred embodiment allow a user to readily determine if the oil filter is new, wherein the reservoir 22 is empty, or used, wherein the reservoir 22 contains residual used oil.

The present invention also comprises a method for easily replacing an oil filter with minimal or no spillage of residual used oil. The method of the preferred embodiment utilizes the replaceable oil filter shown in FIGS. 1–3, and comprises the steps of draining oil from the crankcase of an engine, establishing fluid communication between the upper portion 14 and the reservoir 22 to drain at least a portion of the residual oil from the upper portion 14 into the reservoir 22, and removing the replaceable oil filter assembly from the engine with the residual oil contained within the reservoir 22.

In the preferred embodiment, the barrier assembly of the replaceable oil filter comprises a valve seat assembly 28 in sealing engagement with the seat portion 30 of the barrier layer. Thus, the establishing step of the preferred embodiment comprises urging the valve seat assembly 28 upward from sealing contact with the seat portion 30. This provides a passageway for fluid communication between the upper portion 14 and the lower portion 16 through the aperture 26.

The establishing step for the second embodiment of the present invention shown in FIGS. 4 and 5 comprises urging the valve seat assembly 38 downward from sealing contact with the seat portion 40. In the third embodiment of the present invention, the barrier assembly comprises a breakable seal 48 in sealing engagement with the seat portion 50 of the barrier layer. For this embodiment, the establishing step comprises urging the breakable seal 48 from sealing contact with the seat portion 50 of the barrier layer to provide a passageway for fluid flow through the aperture.

It is to be understood that the form of the invention shown is a preferred embodiment thereof and that various changes and modifications may be made therein without departing from the spirit of the invention or scope as defined in the following claims.

What is claimed is:

1. A replaceable oil filter for use with an engine comprising in combination,
    a housing having an upper portion with a top end forming an opening for threaded engagement with said engine and a lower portion forming a threaded opening,
    a fluid filtration unit positioned within said upper portion,
    a barrier assembly separating said upper portion and said lower portion to prevent fluid communication therebetween, wherein said barrier assembly comprises an impermeable layer subjacent said upper portion forming an aperture and having a seat portion circumscribing said aperture, and a breakable seal in sealing engagement with said seat portion, and
    means for establishing fluid communication between said upper portion and said lower portion, wherein said means comprises an elongated plunger having a distal end positioned below said breakable seal and a threaded base portion at its proximal end in confronting engagement with said threaded opening such that rotation of said threaded base portion urges said plunger upward so that the distal end thereof passes through said aperture and lifts said breakable seal from sealing contact with said seat portion to provide a passageway for fluid communication between said upper portion and said lower portion through said aperture.

2. An oil filter as described in claim 1 further comprising means for indicating whether fluid communication has been established between said upper portion and said lower portion.

3. An oil filter as described in claim 2 wherein said means for indicating comprises a breakable strip having one end affixed to the lower end of the filter housing and a second end affixed to the lower end of the threaded base, wherein said strip is broken upon rotation of said threaded base portion without concomitant rotation of said filter housing.

4. An oil filter as described in claim 2 wherein said means for indicating comprises markings on the lower end of the threaded base portion and the lower end of the filter housing that show the extent of rotation of the threaded base portion in relationship to the filter housing.

5. An oil filter as described in claim 1 wherein said impermeable layer comprises a horizontal plate forming a centrally located aperture.

6. An oil filter as described in claim 1 wherein said barrier assembly further comprises adhesive means for attaching said breakable seal to said impermeable layer.

7. An oil filter as described in claim 1 wherein said elongated plunger has a piercer portion at its distal end.

8. An oil filter as described in claim 1 wherein said threaded base portion further comprises means on a lower end thereof for engagement with a selected tool to impart rotation thereto.

9. An oil filter as described in claim 8 wherein said means for engagement comprises a drive socket formed in the threaded base portion for use with a selected tool such as a socket wrench or ratchet.

10. An oil filter as described in claim 8 wherein said means for engagement comprises a drive head formed in the threaded base portion for use with a selected tool such as a screwdriver.

11. A replaceable oil filter for use with an engine comprising in combination,
    a housing having an upper portion with a top end forming an opening for threaded engagement with said engine and a lower portion forming a threaded opening,
    a fluid filtration unit positioned within said upper portion,
    a barrier assembly separating said upper portion and said lower portion to prevent fluid communication therebetween, wherein said barrier assembly comprises an impermeable layer subjacent said upper portion forming an aperture and having a seat portion circumscribing said aperture, and a breakable seal in sealing engagement with said seat portion, and
    means for establishing fluid communication between said upper portion and said lower portion, wherein said means comprises an elongated plunger having a distal end positioned below said breakable seal and a threaded base portion at its proximal end in confronting engagement with said threaded opening such that rotation of said threaded base portion urges said plunger upward so that the distal end thereof passes through said aperture and pierces said breakable seal to provide a passageway for fluid communication between said upper portion and said lower portion through said aperture.

12. An oil filter as described in claim 11 further comprising means for indicating whether fluid communication has been established between said upper portion and said lower portion.

13. An oil filter as described in claim 12 wherein said means for indicating comprises a breakable strip having one end affixed to the lower end of the filter housing and a second end affixed to the lower end of the threaded base, wherein said strip is broken upon rotation of said threaded base portion without concomitant rotation of said filter housing.

14. An oil filter as described in claim 12 wherein said means for indicating comprises markings on the lower end of the threaded base portion and the lower end of the filter housing that show the extent of rotation of the threaded base portion in relationship to the filter housing.

15. An oil filter as described in claim 11 wherein said impermeable layer comprises a horizontal plate forming a centrally located aperture.

16. An oil filter as described in claim 11 wherein said barrier assembly further comprises adhesive means for attaching said breakable seal to said impermeable layer.

17. An oil filter as described in claim 11 wherein said elongated plunger has a piercer portion at its distal end.

18. An oil filter as described in claim 11 wherein said threaded base portion further comprises means on a lower end thereof for engagement with a selected tool to impart rotation thereto.

19. An oil filter as described in claim 18 wherein said means for engagement comprises a drive socket formed in the threaded base portion for use with a selected tool such as a socket wrench or ratchet.

20. An oil filter as described in claim 18 wherein said means for engagement comprises a drive head formed in the threaded base portion for use with a selected tool such as a screwdriver.

\* \* \* \* \*